Sept. 6, 1932.   N. D. BELNAP   1,875,842
OIL RETAINER
Filed Feb. 19, 1930   2 Sheets-Sheet 1
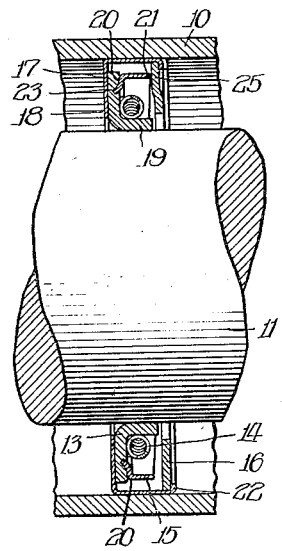
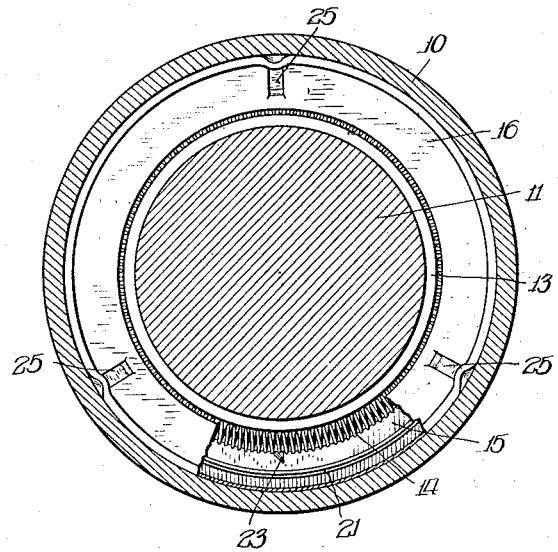
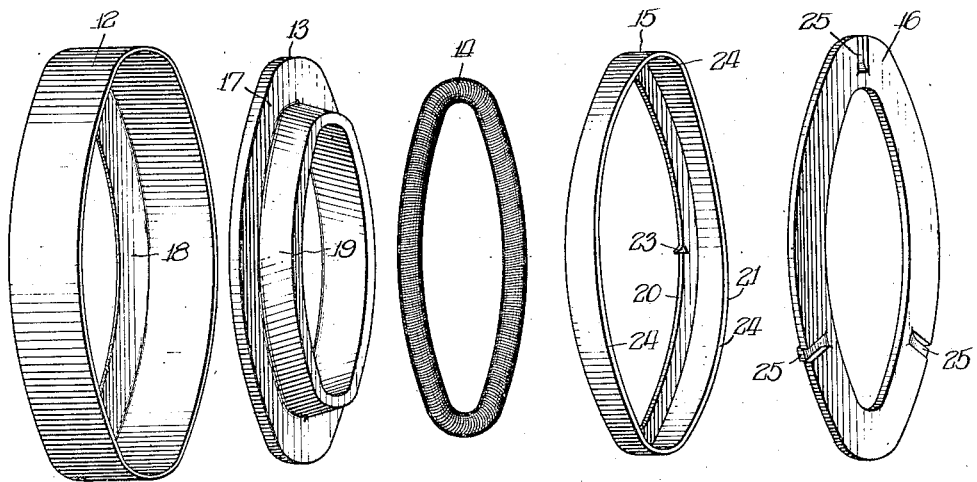
Inventor:
Nuel D. Belnap, Sept. 6, 1932.  N. D. BELNAP  1,875,842
OIL RETAINER
Filed Feb. 19, 1930  2 Sheets-Sheet 2
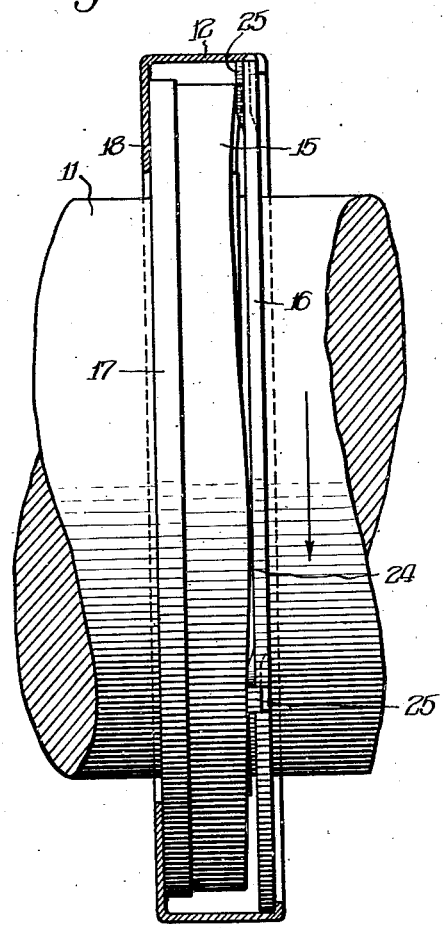
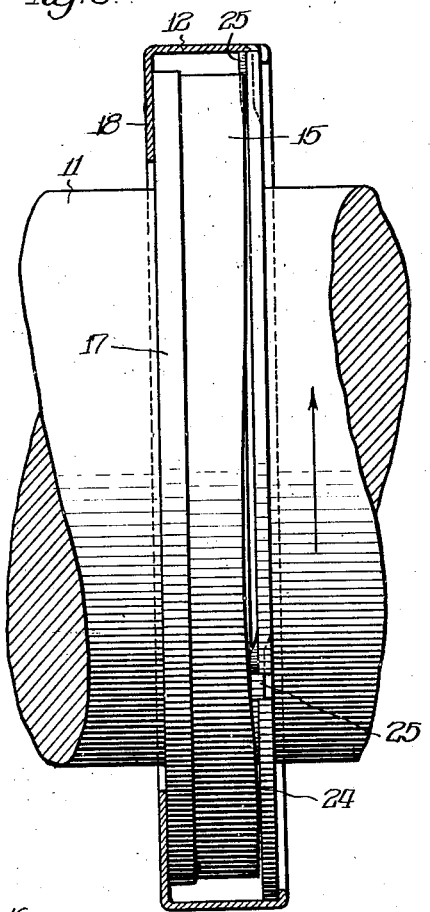
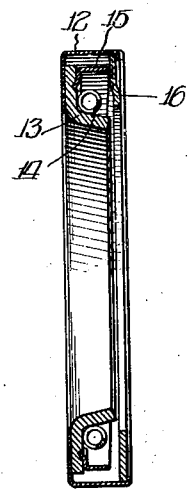
Inventor:
Nuel D. Belnap, Patented Sept. 6, 1932

1,875,842

UNITED STATES PATENT OFFICE

NUEL D. BELNAP, OF WINNETKA, ILLINOIS

OIL RETAINER

Application filed February 19, 1930. Serial No. 429,749.

The fluid retainers which have been used in the past within tubular housings about rotating shafts have been of either the non-floating type or the floating type. In the non-floating type retainers, the packing member, which is made of leather, rubber, cork, or other suitable sealing material, is held tightly against sidewise movement, while, in the floating type retainers, the packing member is permitted to shift sidewise, whereby to remain at all times in concentric relation to the shaft encompassed by the same regardless of changes in the position of the shaft.

A retainer of the floating type is in many respects preferable to one of the non-floating type because in the majority of installations a whipping action occurs in the shaft being sealed when the direction of rotation of the shaft is reversed, and, if the packing member in the retainer is not permitted to follow the shaft, the circular opening in the center of such member will become distorted in time and seriously impair the efficiency of the seal. When the packing member in a retainer of the floating type is made sufficiently loose, however, to permit it to move freely with the shaft during the whipping action of the latter incident to a reversal in the direction of rotation, considerable difficulty is experienced in preventing leakage past the packing member at the surface where the shifting occurs.

The object of the present invention is to provide an improved fluid retainer in which the packing member is free to shift only at the instant when the shaft to which applied is reversed in rotation.

Other objects and advantages of the invention will be apparent to those skilled in the art upon a full understanding of the construction, arrangement and operation of the improved fluid retainer.

One form of the invention is presented herein for the purpose of exemplification, but it will of course be appreciated that the invention is susceptible of embodiment in other structurally modified forms coming equally within the scope of the appended claims.

In the accompanying drawings:

Fig. 1 is a diametric section through a fluid retainer constructed in accordance with the invention, showing the retainer positioned within a tubular housing about a rotating shaft;

Fig. 2 is an end view of the retainer, showing certain portions thereof broken away for clearness;

Fig. 3 is a perspective view of the retainer, showing the several parts thereof separated prior to assembly;

Fig. 4 is a partially sectioned side view of the retainer, showing the wedged position of the pressure ring when the shaft is rotated in one direction;

Fig. 5 is a similar view, showing the oppositely wedged position of the pressure ring when the shaft is rotated in the opposite direction; and Fig. 6 is a diametric section through the retainer, showing the same before application to the shaft.

The retainer shown in the drawings is adapted to be positioned within a tubular housing 10 about a shaft 11, and consists, as shown in Fig. 3, of a centrally apertured cup 12, a flanged packing 13, an endless coil spring 14, an adjustable pressure ring 15 and a washer 16. The cup 12 and washer 16 together constitute a cage in which the packing 13, spring 14 and ring 15 are positioned.

The packing 13, which is made of leather or other suitable sealing material, is arranged with the flat radially extending portion 17 thereof in contiguous fluid-tight engagement with the flat bottom 18 of the cup; the spring 14 is stretched about the axially extending portion 19 of the packing; the ring 15 is positioned with one edge 20 thereof against the radially extending portion 17 of the packing; and the washer 16 is arranged within the open end of the cup 12 against the adjacent edge 21 of the ring 15. The washer is held in the cup by a small inturned flange 22 on the rim thereof, which flange is indented at intervals into recesses in the washer to prevent the latter from turning.

As will be observed, the outside diameter of the radially extending portion 17 of the packing is somewhat smaller than the inside diameter of the cup, which difference in size permits the packing to float a little with respect to the cup when the shaft changes its position in the housing. The edge 20 of the ring 15 is inwardly flanged and is provided with a plurality of sharp prongs 23 which are embedded in the adjacent face of the radially extending portion 17 of the packing, whereby to prevent relative rotation between the ring and the packing. The other edge 21 of the ring is undulated throughout its circumference and is characterized by three or more equidistant cam surfaces 24 which bear against as many equidistant projections 25 on the inner face of the washer 16.

When the retainer is assembled, the washer 16 is positioned in the cup with the projections 25 on the washer preferably located about midway between the cam surfaces 24 on the adjacent edge of the ring 15, in which position the radially extending portion 17 of the packing is in fluid-tight engagement with the bottom 18 of the cup but the packing, together with the spring and the ring, can shift rather freely within the cage.

When the shaft 11 rotates in the direction shown in Fig. 4, it tends to turn the packing 13 with it, due to the snug fluid-tight fit between the shaft and the packing, with the result that the ring 15 is turned by the packing through a small angle into the position shown in Fig. 4, in which position the cam surfaces 24 on the ring are wedged tightly against the projections 25 on the washer and the radially extending portion 17 of the packing is in consequence clamped firmly between the flanged edge 20 of the ring 15 and the bottom 18 of the cup. When the shaft rotates in the other direction, as shown in Fig. 5, the initial movement of the shaft in that direction will carry the packing 13 with it, and the ring 15 will be turned through an intermediate position in which the pressure on the packing is in large measure released and the packing allowed to float into the position shown in Fig. 5, in which last mentioned position the cam surfaces 24 on the ring are wedged in the opposite direction against the projections 25 on the washer. Thus, the only time that the packing 13 is allowed to float freely is at the instant when the direction of rotation of the shaft is reversed, which is ordinarily the only time when the shaft, because of whipping, vibration under inertia and other causes, tends to move off center. At all other times, the packing is held practically stationary in firmly clamped fluid-tight engagement with the bottom of the cup.

I claim:

1. In a fluid retainer which is adapted to be positioned within a tubular housing about a centrally arranged shaft, a cage, a shaft packing shiftably positioned therein, and cam means for automatically causing the packing to be pressed into tightly sealed association with the cage when the shaft rotates.

2. In a fluid retainer which is adapted to be positioned within a tubular housing about a centrally arranged shaft, a cage, a shaft packing shiftably positioned therein, and cam means for automatically causing the packing to be pressed into tightly sealed association with the cage when the shaft rotates in either direction.

3. In a fluid retainer which is adapted to be positioned within a tubular housing about a centrally arranged shaft, a cage, a shaft packing positioned under pressure therein in tightly sealed association therewith, and cam means for automatically relieving some of the pressure on the packing when the shaft changes its direction of rotation, whereby to permit the packing to shift radially relative to the cage at that time.

4. In a fluid retainer which is adapted to be positioned within a tubular housing about a centrally arranged shaft, a cage, a shaft packing shiftably positioned therein, cam means for causing the packing to be pressed into tightly sealed association with the cage when the shaft rotates, and means for releasing said last mentioned means to permit the packing to shift relative to the cage at the instant when the shaft changes its direction of rotation.

5. In a fluid retainer, a cage, a packing member which is shiftably positioned in the cage and is adapted to fit snugly about a shaft, and cam means for automatically sealing the packing member with respect to the cage when the shaft is rotated in either direction.

6. In a fluid retainer, a cage, a packing which is adapted to fit snugly about a shaft passing through the cage, cam means for pressing the packing into tightly sealed engagement with the cage, and means for momentarily decreasing such pressure to permit the packing to float relative to the cage at the instant that the shaft commences to rotate in a direction opposite to that in which it had last been rotating.

7. In a fluid retainer, a flat cylindrical cage having aligned openings in the ends thereof, a flanged packing positioned in the cage with the radially extending portion of the packing in fluid-tight radially shiftable engagement with one end of the cage, a pressure ring positioned between the other end of the cage and the radially extending portion of the packing in non-rotatable engagement with the latter, and a plurality of circumferentially spaced cams acting between the ring and the last mentioned end of the cage for forcing the radially extending portion of the packing into firmly pressed fluid-tight engagement with the cage when the packing together with the ring is turned through a small angle relative to the cage.

8. In a fluid retainer which is adapted to be positioned within a tubular housing about a centrally arranged shaft, a cage, a shaft packing positioned therein in sealed association with a portion of the cage, and cam means responsive to the rotation of the shaft for automatically increasing the pressure of the packing against the cage.

9. In a fluid retainer for use between relatively rotatable members, an annular packing holder which is adapted to be rigidly secured to one of the members in operative relation to the other, a packing carried by the holder in rotatable fluid-tight association with one of the members, and means responsive to relative rotation between the members for pressing a portion of the packing against a portion of the holder into non-rotatable fluid-tight engagement with the latter.

In witness whereof I have hereunto subscribed my name.

NUEL D. BELNAP.